US008504451B2

(12) United States Patent
Faith et al.

(10) Patent No.: US 8,504,451 B2
(45) Date of Patent: Aug. 6, 2013

(54) METHOD AND SYSTEM USING CANDIDATE DYNAMIC DATA ELEMENTS

(75) Inventors: Patrick Faith, Pleasanton, CA (US); Ayman Hammad, Pleasanton, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 102 days.

(21) Appl. No.: 11/940,074

(22) Filed: Nov. 14, 2007

(65) Prior Publication Data

US 2008/0120236 A1    May 22, 2008

Related U.S. Application Data

(60) Provisional application No. 60/884,089, filed on Jan. 9, 2007, provisional application No. 60/866,185, filed on Nov. 16, 2006.

(51) Int. Cl.
*G06Q 40/00* (2012.01)

(52) U.S. Cl.
USPC ............... 705/35; 713/178; 713/168; 708/39

(58) Field of Classification Search
USPC ........ 705/75, 64, 44, 39, 65, 18, 35; 235/382, 235/380; 726/4, 9; 713/172, 168, 178, 182, 713/176; 380/232; 365/96
See application file for complete search history.

(56) References Cited

U.S. PATENT DOCUMENTS

| | | | |
|---|---|---|---|
| 5,465,206 A | 11/1995 | Hilt et al. | |
| 5,477,038 A | 12/1995 | Levine et al. | |
| 5,500,513 A | 3/1996 | Langhans et al. | |
| 5,621,201 A | 4/1997 | Langhans et al. | |
| 5,815,665 A | 9/1998 | Teper et al. | |
| 5,845,070 A | 12/1998 | Ikudome | |
| 6,247,129 B1 | 6/2001 | Keathley et al. | |
| 6,270,011 B1 | 8/2001 | Gottfried | |
| 6,282,522 B1 | 8/2001 | Davis et al. | |
| 6,560,581 B1 | 5/2003 | Fox et al. | |
| 6,631,849 B2 | 10/2003 | Blossom | |
| 6,837,425 B2 | 1/2005 | Gauthier et al. | |
| 6,915,279 B2 | 7/2005 | Hogan et al. | |
| 6,920,611 B1 | 7/2005 | Spaeth et al. | |
| 6,957,334 B1 | 10/2005 | Goldstein et al. | |
| 7,007,840 B2 | 3/2006 | Davis | |
| 7,039,611 B2 | 5/2006 | Devine | |
| 7,051,923 B2 | 5/2006 | Nguyen et al. | |
| 7,104,446 B2 | 9/2006 | Bortolin et al. | |
| 7,111,789 B2 | 9/2006 | Rajasekaran et al. | |
| 7,121,456 B2 | 10/2006 | Speath et al. | |
| 7,124,937 B2 | 10/2006 | Myers et al. | |
| 7,136,841 B2 | 11/2006 | Cook | |

(Continued)

OTHER PUBLICATIONS

U.S. Appl. No. 11/267,348.

(Continued)

*Primary Examiner* — Behrang Badii
(74) *Attorney, Agent, or Firm* — Kilpatrick Townsend & Stockton LLP

(57) ABSTRACT

A method and computer readable medium for conducting a transaction, comprising receiving a verification value and a portion of a dynamic data element, determining candidate dynamic data elements using the portion of the dynamic data element, calculating candidate verification values using candidate dynamic data elements, and determining if the received verification value matches any of the candidate verification values, wherein the transaction is thereafter authenticated if a candidate verification value matches a candidate verification value.

14 Claims, 3 Drawing Sheets

U.S. PATENT DOCUMENTS

| | | |
|---|---|---|
| 7,152,780 B2 | 12/2006 | Gauthier et al. |
| 7,163,153 B2 | 1/2007 | Blossom |
| 7,191,952 B2 | 3/2007 | Blossom |
| 7,243,853 B1 | 7/2007 | Levy et al. |
| 7,280,981 B2 | 10/2007 | Huang et al. |
| 2002/0111919 A1 | 8/2002 | Weller et al. |
| 2002/0194138 A1 | 12/2002 | Dominguez et al. |
| 2003/0105964 A1* | 6/2003 | Brainard et al. ............... 713/178 |
| 2003/0120593 A1 | 6/2003 | Bansal et al. |
| 2003/0172040 A1 | 9/2003 | Kemper et al. |
| 2003/0200184 A1 | 10/2003 | Dominguez et al. |
| 2003/0212642 A1 | 11/2003 | Weller et al. |
| 2003/0233292 A1 | 12/2003 | Richey et al. |
| 2004/0019522 A1 | 1/2004 | Bortolin et al. |
| 2004/0044621 A1 | 3/2004 | Huang et al. |
| 2004/0050922 A1 | 3/2004 | Gauthier et al. |
| 2004/0054581 A1 | 3/2004 | Redford et al. |
| 2004/0054590 A1 | 3/2004 | Redford et al. |
| 2004/0054591 A1 | 3/2004 | Spaeth et al. |
| 2004/0059688 A1 | 3/2004 | Dominguez et al. |
| 2004/0139021 A1 | 7/2004 | Reed et al. |
| 2004/0148224 A1 | 7/2004 | Gauthier et al. |
| 2004/0153715 A1 | 8/2004 | Spaeth et al. |
| 2004/0172535 A1* | 9/2004 | Jakobsson et al. ............ 713/168 |
| 2004/0220964 A1 | 11/2004 | Shiftan et al. |
| 2004/0230536 A1 | 11/2004 | Fung et al. |
| 2005/0021456 A1 | 1/2005 | Steele et al. |
| 2005/0029344 A1 | 2/2005 | Davis |
| 2005/0036611 A1 | 2/2005 | Seaton, Jr. et al. |
| 2005/0045718 A1 | 3/2005 | Bortolin et al. |
| 2005/0058427 A1 | 3/2005 | Nguyen et al. |
| 2005/0071225 A1 | 3/2005 | Bortolin et al. |
| 2005/0071226 A1 | 3/2005 | Nguyen et al. |
| 2005/0071227 A1 | 3/2005 | Hammad et al. |
| 2005/0071228 A1 | 3/2005 | Bortolin et al. |
| 2005/0071235 A1 | 3/2005 | Nguyen et al. |
| 2005/0102234 A1 | 5/2005 | Devine |
| 2005/0121506 A1 | 6/2005 | Gauthier et al. |
| 2005/0149455 A1 | 7/2005 | Bruesewitz et al. |
| 2005/0171905 A1 | 8/2005 | Wankmueller |
| 2005/0246278 A1 | 11/2005 | Gerber et al. |
| 2005/0283416 A1 | 12/2005 | Reid et al. |
| 2005/0283430 A1 | 12/2005 | Reid et al. |
| 2005/0283431 A1 | 12/2005 | Reid et al. |
| 2005/0283432 A1 | 12/2005 | Reid et al. |
| 2005/0283433 A1 | 12/2005 | Reid et al. |
| 2006/0006224 A1 | 1/2006 | Modi |
| 2006/0080243 A1 | 4/2006 | Kemper et al. |
| 2006/0155644 A1 | 7/2006 | Reid et al. |
| 2006/0163345 A1 | 7/2006 | Myers et al. |
| 2006/0178957 A1 | 8/2006 | LeClaire |
| 2006/0179007 A1 | 8/2006 | Davis |
| 2006/0290501 A1 | 12/2006 | Hammad et al. |
| 2006/0293027 A1 | 12/2006 | Hammad et al. |
| 2007/0001000 A1 | 1/2007 | Nguyen et al. |
| 2007/0001001 A1 | 1/2007 | Myers et al. |
| 2007/0005613 A1 | 1/2007 | Singh et al. |
| 2007/0005774 A1 | 1/2007 | Singh et al. |
| 2007/0012764 A1 | 1/2007 | Bortolin et al. |
| 2007/0017970 A1 | 1/2007 | Gauthier et al. |
| 2007/0034679 A1 | 2/2007 | Gauthier et al. |
| 2007/0055597 A1 | 3/2007 | Patel et al. |
| 2007/0055630 A1 | 3/2007 | Gauthier et al. |
| 2007/0057034 A1 | 3/2007 | Gauthier et al. |
| 2007/0057051 A1 | 3/2007 | Bortolin et al. |
| 2007/0083465 A1 | 4/2007 | Ciurea et al. |
| 2007/0100691 A1 | 5/2007 | Patterson |
| 2007/0125842 A1 | 6/2007 | Antoo et al. |
| 2007/0136211 A1* | 6/2007 | Brown et al. ................... 705/75 |
| 2008/0110983 A1* | 5/2008 | Ashfield ........................ 235/382 |
| 2008/0120236 A1* | 5/2008 | Faith et al. ..................... 705/44 |

OTHER PUBLICATIONS

U.S. Appl. No. 11/558,947.

* cited by examiner

METHOD AND SYSTEM USING CANDIDATE DYNAMIC DATA ELEMENTS

CROSS-REFERENCES TO RELATED APPLICATIONS

This is a non-provisional patent application of and claims the benefit of the filing dates of U.S. Provisional Patent Application No. 60/884,089 filed on Jan. 9, 2007 and U.S. Provisional Patent Application No. 60/866,185 filed on Nov. 16, 2006. These applications are herein incorporated by reference in their entirety for all purposes.

BACKGROUND

As methods and devices for engaging in financial transactions have increased, old problems such as fraud and counterfeiting persist.

One of the primary sources of fraud, which is prevalent in the credit card industry is skimming. Skimming refers to the electronic copying of a card's magnetic stripe data to create counterfeit cards.

Skimming is predominantly a phenomenon afflicting magnetic stripe based transactions. This is because the magnetic stripe, which is placed on the back of a transaction card and stores a variety of data on three separate tracks, is a passive medium. In other words, the digital content of the magnetic stripe can be perfectly copied, without any difference between the copy and the original.

One of the primary means by which skimming can be prevented is for the consumer to closely monitor the whereabouts of his transaction card. This may allow the consumer to prevent the card from being swiped through inappropriate devices. However, as contactless cards evolve, the classic skimming problem comes along with it. In fact, in a wireless environment the opportunity to skim magnetic stripe data is more prevalent. In a wireless environment, a potential skimmer need not physically possess the card to be skimmed nor have access to any of the physical equipment (e.g. POS terminal, communication lines, etc.), which is required for skimming in a wire based environment. A skimmer can, without the knowledge of the consumer or merchant, intercept the wireless transaction and copy the data being transmitted from the card to POS terminal.

Some prior systems use an encrypted dynamic card verification value (dCVV) to authorize a transaction. At the front end, a portable consumer device generates the dCVV based on a counter that changes after every transaction. In some cases, the front end transmits the dCVV and the counter on Track data to the backend. The backend computer independently generates a second dCVV based on the transmitted counter. To verify the transaction, the backend matches the second dCVV to the dCVV received from the front end. If the values match, the transaction is considered authentic. If the values do not match, this may indicate that the transaction is fraudulent.

Although the above system works well, counters typically take up, at least, four or five characters of Track data since consumers could conceivably make thousands of transactions on a single portable consumer device. Track data is communicated from the portable consumer device to various other devices to authenticate the transaction. Due to the limited available space in the tracks, the number of characters in a counter data field may be limited, for example, to four characters. If the consumer conducts more than 9999 transactions, then the counter data field may not be able to accommodate counter values with more than four characters long. Thus, reducing the number of characters in Track data would be desirable.

Also, an unauthorized person could potentially intercept a counter value that is present in the Track data if it is in the clear and unencrypted. If the unauthorized person knows other information that is used to create a dCVV, the dCVV could theoretically be obtained by the unauthorized person and the unauthorized person could potentially conduct fraudulent transactions.

Embodiments of the disclosure address the above problems, and other problems, individually and collectively.

BRIEF SUMMARY

Embodiments of the disclosure are directed to methods, computer readable medium, and systems for conducting a transaction.

One embodiment of the disclosure is directed to a method that receives a verification value and a portion of dynamic data element and determines candidate dynamic data elements using the portion of the dynamic data element. The method further calculates candidate verification values using the candidate dynamic data elements. The method also determines if the received verification value matches any of the candidate verification values. The transaction is thereafter authenticated if the received verification value matches any of the candidate verification values.

Another embodiment of the disclosure is directed to a method that generates a verification value in response to a transaction involving a portable consumer device and sends the verification value and a portion of a dynamic data element to a service provider. The service provider determines whether the verification value matches any of a plurality of candidate verification values. Each of the candidate verification values is calculated using the candidate dynamic data elements. Each of the dynamic data elements is calculated using the portion of the dynamic data element. The transaction is thereafter authenticated if the verification value matches any of the candidate verification values.

These and other embodiments of the disclosure are described in further detail below.

DETAILED DESCRIPTION

Figure 1:
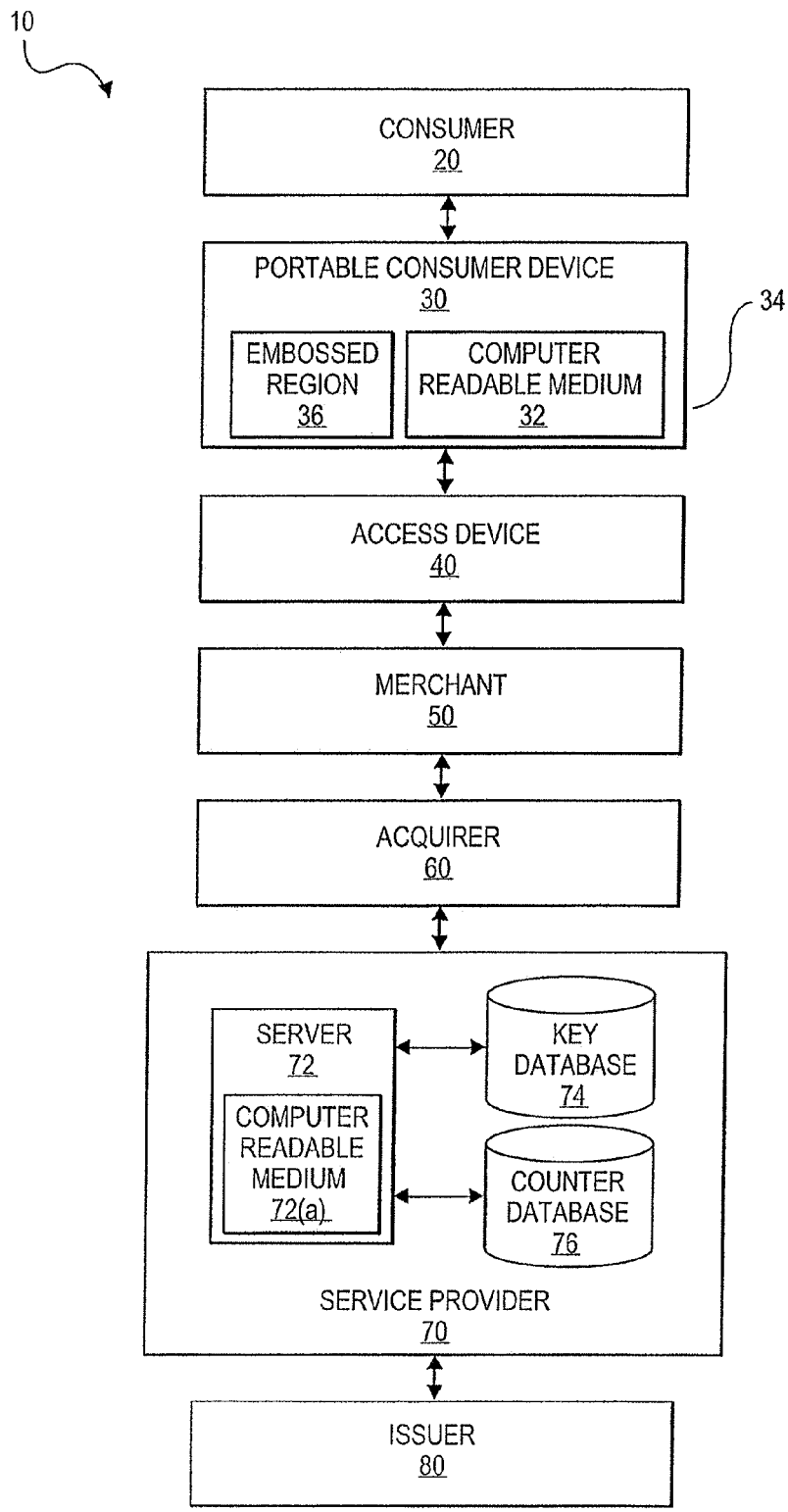
FIG. 1 is a block diagram illustrating a system for conducting a transaction, in accordance with an embodiment of the disclosure.

Embodiments of the disclosure may solve above-noted problems by sending only a portion of a dynamic data element such as a counter value from a payment card (or other portable consumer device) or a point of sale (POS) terminal (or other access device) to a backend computer operated by a server provider (e.g., an issuer, a payment processing organization, etc.). In some embodiments, the portion of the dynamic data element may be a counter value (e.g., the value "108") and the portion of the dynamic data element may be a portion of a counter value (e.g., the value "8'"). The portion of the dynamic data element and a first verification value that is determined by the card or POS terminal using the dynamic data element may be embedded in Track data, which may be sent to the backend computer.

The backend computer can also store the current value of the dynamic data element. For example, the backend computer can store a counter value that keeps track of the number of transactions conducted using the payment card. The backend computer first calculates a second verification value using the stored counter value. If the second verification value that is calculated using the stored counter value matches the first verification value, the backend computer operated by the service provider may determine that the card is authentic. An authorization response message may be subsequently sent to the POS terminal indicating that the transaction is authorized.

If the first verification value received in the Track data and the second verification value do not match, or if additional verification is needed, the backend computer may independently determine a third verification value using the portion of the dynamic data element. The first verification value and the second verification value may not match for a number of reasons. For example, in some instances, the counter stored at the backend computer may not match a counter stored on a payment card, and the verification values calculated at the front end of the transaction and the backend of the transaction may be different. The counter values may not match for a number of reasons. For example, some airline ticket terminals use credit cards to identify passengers, but a payment transaction is not conducted. In this case, the counter in a card may increment by "1", but the backend computer counter value may not increment since a payment transaction was not conducted.

If the first and second verification values do not match, candidate dynamic data element values are calculated using the portion of the dynamic data element. The candidate dynamic data element values are then used to determine candidate verification values. If one of the candidate verification values (e.g., a third verification value) matches the first verification value, the backend computer may determine that the card is authentic. If none of the candidate verification values matches the first verification value, the card may not be authentic and the transaction may be fraudulent. The backend computer may then initiate the sending of an authorization response message to the POS terminal that the transaction is declined.

Illustratively, a consumer may want to pay for a good at a merchant. The consumer may use his payment card (e.g., a credit card) and may use it to interact with the merchant's POS terminal. The card may generate a counter value of "17" indicating that this is the 17$^{th}$ transaction conducted using the card. It may also generate a dynamic card verification value of "128" using the counter value and a predetermined algorithm. The dynamic card verification value "128" and the character "7" (i.e., a portion of the counter value) are included in the Track data that is passed from the POS terminal to the backend computer.

The backend computer receives the Track data including the dynamic card verification value "128" and the portion of the counter value "7". It then calculates a second verification value using a stored counter value. The stored counter value in this example may be, for example, "16" and a second verification value of "130" could be generated using the stored counter value. Because the first and second verification values do not match, the backend computer may determine that the stored counter value could possibly be slightly different than the received counter value.

The backend computer can then determine candidate counter values using the portion of the counter value "7". Because the last stored counter value was "16", the backend computer may determine counter values that are multiples of 10 of the number "7". That is, the backend computer may calculate candidate counter values including "17", "27" and "37". Using these candidate counter values, various candidate verification values may be calculated. It may be subsequently determined that "17" results in the same verification value as the first verification value. The backend computer may then initiate the authorization process, and may subsequently store the counter value of "17" for future reference.

Embodiments of the disclosure provide for multiple advantages. For example, by transmitting only a portion of the counter value in the transmitted Track data, less data can be transmitted resulting in faster data transmission and processing. Alternatively or additionally, by transmitting only a portion of a counter value, other space within the Track data can be used for other purposes. For instance, a longer verification value could be used in the Track data. This would make it more difficult for fraudulent activity to take place. Yet another advantage is that by only including a portion of the counter value in the Track data, a skimmer cannot retrieve the entire counter value by intercepting the Track data. The skimmer might receive, for example, the number "7" and the skimmer would not know if that the "7" may actually represent "17". Embodiments of the disclosure may include none, some, or all of the above technical advantages.

FIG. 1 is a system 10 for conducting a transaction, in accordance with an embodiment of the disclosure. System 10 includes a consumer 20, a portable consumer device 30 associated with consumer 20, an access device 40 for interacting with portable consumer device 30, and a merchant 50 associated with access device 40. In a typical payment transaction, consumer 20 may purchase goods or services at merchant 50 using portable consumer device 30 at access device 40. System 10 also includes an acquirer 60 associated with merchant 50 and a service provider 70 that authenticates portable consumer device 30. System 10 also includes an issuer 80 for issuing portable consumer device 30 to consumer 20.

Consumer 20 refers to an entity or entities that are capable of purchasing goods or services or making any suitable transaction with merchant 50. In some cases, consumer 20 may be an organization such as a business.

Portable consumer device 30 may be in any form that is suitable for generating and storing data related to the transaction as described herein. Suitable portable consumer devices 30 can be hand-held and compact so that they can fit into a consumer's wallet and/or pocket (e.g., pocket-sized). In some embodiments, portable consumer device 30 may comprise a microprocessor. In other embodiments, portable consumer device 30 may include an integrated circuit card. Examples of portable consumer devices 30 may include smart cards, magnetic stripe cards, keychain devices (such as the Speedpass™ commercially available from Exxon-Mobil Corp.), etc. Other examples of portable consumer devices 30 may include cellular phones, personal digital assistants (PDAs), pagers, payment cards, security cards, access cards, smart media, transponders, and the like.

In one embodiment, portable consumer devices 30 comprises a computer readable medium and a body. The computer readable medium may be on the body of payment token 22. The body may in the form of a plastic substrate, a housing, or other structure. The computer readable medium may be a memory that stores data and may be in any suitable form. Exemplary computer readable media may be in any suitable form including a magnetic stripe, a memory chip, etc. If payment token is in the form of a card, it may have an embossed region (ER) which is embossed with a PAN (primary account number). Computer readable medium may electronically store the PAN as well as other data such as PIN data.

In one embodiment, portable consumer device 30 comprises a computer readable medium (CRM) 32 and a body 34. Computer readable medium 32 is on body 34. Body 34 may be in the form of a plastic substrate, housing, or other structure. Computer readable medium 32 may be a memory that stores data and may be in any suitable form. Exemplary computer readable media 32 may be in any suitable form including a magnetic stripe, a memory chip, etc. If computer readable medium 32 is in the form of a card, it may have an embossed region (ER) 36 which is embossed data such as a primary account number (PAN). Computer readable medium 32 may electronically store the PAN as well as other data such as PIN data. Portable consumer devices 30 may also include processors, antennas, batteries, other memory, displays, and other suitable components. Portable consumer devices 30 may also include interface regions for allowing portable consumer device 30 to communicate data to access device 40. Interface regions may include, for example, antennas or electrically conductive elements.

Access device 40 may be in any form that is suitable for sending and/or receiving data from portable consumer device 30. Examples of access devices include point of sale (POS) terminals, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, websites, and the like. Access device 40 may use any contact or contactless mode of operation.

If access device 40 is a point of sale terminal, any suitable point of sale terminal may include a reader, a processor and a computer readable medium. The reader may include any suitable contact or contactless mode of operation. For example, exemplary card readers can include RF (radio frequency) antennas, optical scanners, bar code reader, magnetic stripe readers, etc. to interact with portable consumer device 30.

Merchant 50 refers to any entity or entities that is capable of making a transaction with consumer 20. Examples of merchants 30 include a department store, a gas station, a drug store, a grocery store, and other suitable business. Merchant 50 may use any suitable method to make the transaction. For example, merchant 50 may have, or may receive communications from access device 40 that is interacting with portable consumer device 30. As another example, merchant 50 may use an e-commerce business to allow transaction to be made to merchant 50 through the internet.

Acquirer 60 refers to any entity that has an account with merchant 30. For example, acquirer 60 may be a bank.

Issuer 80 refers to any entity that is capable of issuing portable consumer device 30 to consumer 20. For example, issuer 80 may be a bank. In another example, issuer 34 may be a business entity such a retail store. Some entities are both acquirers 60 and issuers 80, and embodiments of the disclosure include such entities.

Payment data refers to data elements that are used by service provider 70 to authenticate and execute a transaction. Payment data may be in any suitable form. For example, payment data may be in the form of Track data, as understood by one of ordinary skill in the credit card industry, such as the primary account number, expiration data, service codes, and discretionary data. In one case, Track data may be included in an authorization request from portable consumer device 30 to service provider 70 that requests authorization of the transaction. Payment data may also comprise a unique card identification number or a unique identification number for service provider 70. Payment data may reside in memory on any component of system 10 in some embodiments. For example, payment data may be stored in memory of computer readable medium 32 of portable consumer device 30. Payment data may be generated by one or more components of system 10. For example, portable consumer device 30 may generate and send payment data to access device 40. In response, access device 40 may generate a portion of payment data and amend the payment data received from consumer device 30. Some payment data may be encrypted.

Payment data may comprise any suitable combination of dynamic and static data elements. Dynamic data elements refer to data that can change over time. Static data elements refer to data that does not usually change over time.

In some embodiments, payment data includes dynamic data elements to help ensure that portable consumer device 30 is authentic. Dynamic data elements may include any suitable data that changes over time. For example, dynamic data elements may represent the time of day, the current transaction amount, the terminal ID, the merchant ID, a randomly generated number, etc.

An exemplary embodiment of a dynamic data element is a counter. The counter may be of any suitable type. In some cases, counter may be an integer value that counts transactions such as an application transaction counter (ATC). In other cases, counter may be a pointer that indicates a storage location that changes after each or nearly each transaction. For example, counter may be a pointer that indicates a location A, B, C, or D. After each or nearly each transaction, the counter may change indicating a new location. The counter may be any suitable number of digits or characters in length. Since consumer 20 could conceivably make thousands of transactions during the lifetime of portable consumer device 30, a counter that counts transactions may be a four or eights-digit number in some embodiments.

In one example embodiment, a counter is maintained by portable consumer device 30 and a separate counter is maintained by service provider 70. The service provider counter may be compared with the portable consumer device 30 counter to determine if portable consumer device 30 is authentic. In other embodiments, other components of system 10 may maintain counters.

A counter may be initially set to a predetermined value at any suitable time. For example, the counter may be initially set by service provider 70 to "00001." Thereafter, the counter may be incremented with each transaction or nearly each transaction. For example, the counter may be incremented by "00001" or a predetermined increment each time the card is read.

Alternatively, it is possible to vary the initial counter value with the particular card so that it is more difficult for a skimmer to determine the initial counter value. When embossing a payment card or at the initial issuance of a portable consumer device 30, one may first construct a block with personal information such as a PAN (16 characters), expiration date (4 characters) and service code (3 characters), second apply a suitable card verification value (CVV) calculation method using the above block and a unique derived key, third select the 4 leftmost digits from the resulting cipher-text and apply a modulus-5000 function, and fourth use the result as the initial counter value. Server 72 may first set default value of "0000" to the counter in the counter database, and then during authorization, if the counter value is equal to "0000" compute initial counter value as specified above for embossing above and update the counter database with this value. Advantageously, by providing a unique initial counter value (or other dynamic data element), it is more difficult for an observer to determine the actual counter value if only a portion of the counter value is transmitted as part of the Track data.

Static data elements can also be used to verify that portable consumer device 30 being used in the transaction is authentic. Examples of static data elements include an expiration date, a phone number, a card number, a service code, a primary account number (PAN), and a primary identification number (PIN). Static data elements can be stored in memory on a system component in some embodiments. In other embodiments, portable consumer devices 30 may have static data elements printed on body 34 of portable consumer device 30. For example, credit cards have static data elements printed on the back. In this example, when conducting a transaction over the telephone or Internet, merchant 50 may ask for the static data element printed on the back of the card to verify that the caller possesses the authentic portable consumer device 30.

Verification values refer to authenticating data that is generated using an algorithm which uses any suitable combination of dynamic and static data elements. One or more verification values may be embedded in payment data to help secure the payment data. Verification values may be generated by any component of system 10. For example, portable consumer device 30 may generate a verification value and embed it in the payment data along with other transaction information. In another example, portable consumer device 30 may send payment data with transaction information to merchant 50 using access device 40. In response, access device 40 may generate a verification value using the transaction information and embed the verification value into payment data that is communicated to service provider 70. If payment data includes an embedded verification value, payment data may also include an indicator for identifying the type and format of the verification value that is included in the payment data.

Payment data such as verification values may be encrypted using encryption keys such as unique derived keys (UDKs). UDKs may take any preselected value and may be generated using any suitable data. For example, UDKs may be generated using a master derivation key from service provider 70 and static data elements such as a PAN and an account sequence number.

Service provider 70 refers to any entity that is capable of authenticating portable consumer device 30 used in the transaction. In the illustrated embodiment, service provider 70 includes server 72 having a computer readable medium 72(a), key database 74, and counter database 76. Encryption keys such as UDKs are stored and retrieved from key database 74 or derived from a Master key on the fly. Dynamic data elements such as counters are stored on and retrieved from counter database 76. Server 72 is in operative communication with key database 74 to process keys in key database 74. For example, server 72 may retrieve a key from key database 74, modify the key, and store the key on key database 74. Server 72 is in operative communication with counter database 76 to process counters in counter database 76. For example, server may retrieve a counter from counter database 76, may change the retrieved counter, and may store the changed counter on counter database 76.

Service provider 70 may also include data processing subsystems, networks, and operations used to support and deliver authorization services, exception file services, and clearing and settlement services. An exemplary service provider 70 may include VisaNet™. Service providers 70 that include VisaNet™ are able to process credit card transactions, debit card transactions, and other types of commercial transactions. VisaNet™, in particular, includes a VIP system (Visa Integrated Payments system) which processes authorization requests and a Base 11 system which performs clearing and settlement services. Service provider 70 may use any suitable wired or wireless network, including the Internet.

Server 72 may include any hardware, software, other logic, or combination of the preceding for servicing the requests from one or more client computers. Server 72 may use any of a variety of computing structures, arrangements, and compilations for servicing the requests from one or more client computers. In one embodiment, server 72 may be a powerful computer or cluster of computers. For example, server 72 can be a large mainframe, a minicomputer cluster, or a group of servers functioning as a unit. In one example, server 72 may be a database server coupled to a Web server. Server 72 services the requests of one or more client computers. In the illustrated embodiment server 72 includes a computer readable medium 72(a) that can be a memory that stores data and may be in any suitable form.

Key database 74 and counter database 76 may include any hardware, software, firmware, or combination of the preceding for storing and facilitating retrieval of information. Also, key database 74 and counter database 76 may use any of a variety of data structures, relational databases, arrangements, and compilations to store and facilitate retrieval of information. In the illustrated embodiment, key database 74 and counter database 76 are located on service provider 70. Key database 74 and counter database 76 may be located on other components of system 10 in other embodiments. For example, key database 74 and counter database 76 may be located on issuer 80 or on acquirer 60. In some embodiments, key database 74 and counter database 76 may be accessible by other components of system 10. In one embodiment, the server 72 can store information to and retrieve information from key database 74 and counter database 76.

To help secure a data element, payment data may include an embedded portion of the data element from which the entire data element can be generated using an algorithm. A portion of the data element may refer to one or more characters of the data string representing the data element. For example, a data element may be a counter that is represented by a five-character data string "00034." A portion of the data element may be one or more characters of the data string "00034" such as the fifth character "4." Payment data may be embedded with the "4." If a skimmer obtains payment data with the embedded "4," the skimmer may not have an indication of the total number of digits in the counter or which digit of the counter is represented by the "4."

An algorithm is used to generate the data element from the portion of the data element embedded in the payment data. An indicator may also be embedded in the payment data to indicate the algorithm to use to generate the data element from the portion. For example, service provider 70 receives payment data with an embedded portion "4" of the data element "00034." Service provider 70 may also receive an indicator of an algorithm to generate "00034" from "4."

Server 72, an example of a backend computer, using simple, complex, or predictive modeling algorithms to generate any suitable number of candidate data elements based on the portion of the data element embedded in the payment data. Candidate data elements refer to data elements that are possible matches to the actual data element. Candidate data elements are generated by server 72 with the algorithm using the portion of the data element embedded in the received payment data. Candidate dynamic elements refer to candidate data elements that are associated with dynamic data elements. Candidate static elements refer to candidate data elements that are associated with static data elements. In the example above, candidate data elements may include ten values such as "00004," "00014," "00024," "00034," "00044," "00054," "00064," "00074," "00084," and "00094."

Server 72 uses the algorithm to generate candidate verification values from the candidate data elements. Payment data includes the verification value generated by another component of system 10 that is used to authenticate portable consumer device 30. If one of the candidate verification values matches the received verification value, portable consumer device 30 may be authentic. If not, portable consumer device 30 may be fraudulent.

In the illustrated embodiment, consumer 20 purchases a good or service at merchant 50 using portable consumer device 30 such as a card having a magnetic stripe with an embedded chip. A counter in the embedded chip is changed every time a transaction is made. Portable consumer device 30 generates a verification value using one or more dynamic data elements such as the counter. The verification value and a portion of the counter are embedded in the payment data in the form of Track data. Portable consumer device 30 communicates the Track data in an authorization message to merchant 50 using access device 40 such as a POS terminal. Alternatively, access device 40 may receive transaction information from portable consumer device 30, generate a verification value using the received information, and embed the verification value and a portion of the counter into the payment data in the form of Track data in an authorization message. In either case, access device 40 sends the authorization message with the Track data to acquirer 60 and acquirer 60 sends the authorization message to service provider 70.

To authenticate portable consumer device, server 72 retrieves a counter stored in counter database 76. The retrieved counter may represent, for example, transactions that service provider 70 has previously authenticated or the number of times the portable consumer device 30 has been read. In other examples, the retrieved counter may indicate a storage location that represented the last transaction that service provider 70 has previously authenticated. Server 72 also retrieves UDKs stored in key database 74. If there are no UDKs stored in key database 74, service provider 70 generates UDKs using static data elements such as a PAN, an account sequence number, an inverse account number, an inverse of account sequence number, and padding.

Server 72 generates a verification value based on the retrieved counter and retrieved (or generated) UDKs. If the generated verification value matches the verification value in the payment data, portable consumer device 30 may be authentic and service provider 70 may send a message authorizing the transaction.

If the verification values do not match or there is some other reason to suspect that the transaction is fraudulent, server 72 uses an algorithm to generate candidate counter values using the portion of the counter embedded in the payment data. An indicator in the payment data may indicate the algorithm to use. Server 72 generates candidate verification values using the candidate counter values and the retrieved (or generated) UDKs. Server 72 compares the candidate verification values to the verification value in the payment data. If any of the candidate verification values match the verification value in the payment data, portable consumer device 30 may be authentic and service provider 70 sends a message authorizing the transaction. If not, portable consumer device 30 may be fraudulent and service provider 70 sends a message declining the transaction.

The backend computer may comprise any suitable server at a component of system 10 or at an entity in communication with system 10. For example, the backend computer may be a server at issuer 80. In some example embodiments, the backend computer is server 72 of service provider 70.

Modifications, additions, or omissions may be made to system 10 without departing from the scope of the disclosure. The components of system 10 may be integrated or separated according to particular needs. Moreover, the operations of system 10 may be performed by more, fewer, or other system modules. Additionally, operations of system 10 may be performed using any suitable logic comprising software, hardware, other logic, or any suitable combination of the preceding.

Figure 2:
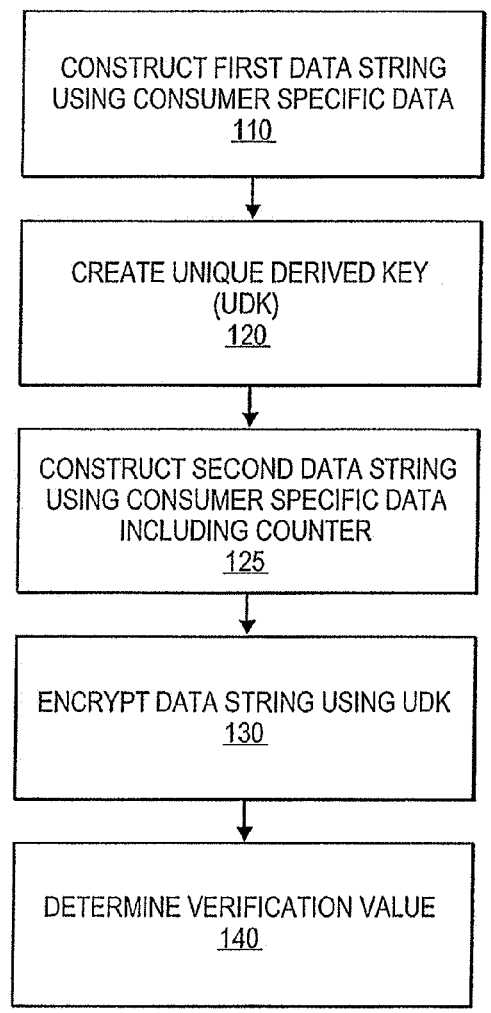
FIG. 2 is a flowchart illustrating a method for generating a verification value, in accordance with an embodiment of the disclosure.

FIG. 2 is a flowchart illustrating a method for generating a verification value, in accordance with an embodiment of the disclosure.

Each time a transaction is initiated, a verification value may be generated on portable consumer device 30 for authentication purposes. Exemplary methods may be found in U.S. patent application Ser. No. 10/642,878, which is incorporated by reference for all purposes.

Initially, a first data string is constructed by first concatenating consumer specific data such as a PAN, an account sequence number, an inverse of the PAN, and an inverse of the account sequence number (step 110). Padding of zeroes, or some other value is added, if necessary, to fill the first data string to a predetermined length. The padding characters may consists of a stream of 0's, 1's or any numeric value known to portable consumer device 30 and service provider 70. In one embodiment, the first data string is 128 bits in length.

The first data string is encrypted using a master derivation key as the encryption key for each encryption stage to generate one or more UDKs (step 120). The master derivation key is deployed by service provider 70 to portable consumer device 30. The encryption stages may use any type of encryption methodology (triple DES) and any suitable type of encryption key.

A second data string is constructed using consumer specific data including a dynamic data element such as a portion of a counter (step 125). One may construct a string by replacing the left most 4 digits of the Primary Account Number (PAN) with the ATC. This will be referred to as the PAN in subsequent steps. Then, one may:

1. Construct a string of bits by concatenating, from left to right, with the following data: Primary Account Number (PAN), Card Expiration Date, and Service Code; and
2. Expand the above string to 128-bit field by right-filling the remaining bits with binary zeros.

The second data string is encrypted using the one or more generated UDKs (step 130) to produce an encrypted data string. Any methodology may be used to encrypt the second string data including the methodologies in U.S. patent application Ser. No. 10/642,878.

The verification value is then determined from the encrypted data string (step 140). In one exemplary embodiment, the 4 leftmost digits from the resulting cipher-text can be the verification value.

Once generated, the verification value is embedded into payment data that is in the form of Track data transmitted from portable consumer device 30 to access device 40. In one embodiment, the Track data includes data elements such as a PAN, an expiration date, a service code, indicators, a portion of a counter, PIN data fields, and the verification value. The Track data received by access device 40 may appear to access device 40 as standard Track data. In other words, access device 40 may not be able to determine if a verification value is embedded and where such verification value may be located. There is no indication to access device 40 that a verification value is embedded into the Track data received from portable consumer device 30.

In an alternate embodiment, portable consumer device 30 communicates information related to the transaction to access device 40. Access device 40 follows similar steps to those followed by portable consumer device 30 to generate a verification value based on the information communicated from portable consumer device 30. Access device 40 then embeds the generated verification value into the payment data that is in the form of Track data.

Modifications, additions, or omissions may be made to the method without departing from the scope of the disclosure. The method may include more, fewer, or other steps. Additionally, steps may be performed in any suitable order without departing from the scope of the disclosure.

Figure 3:
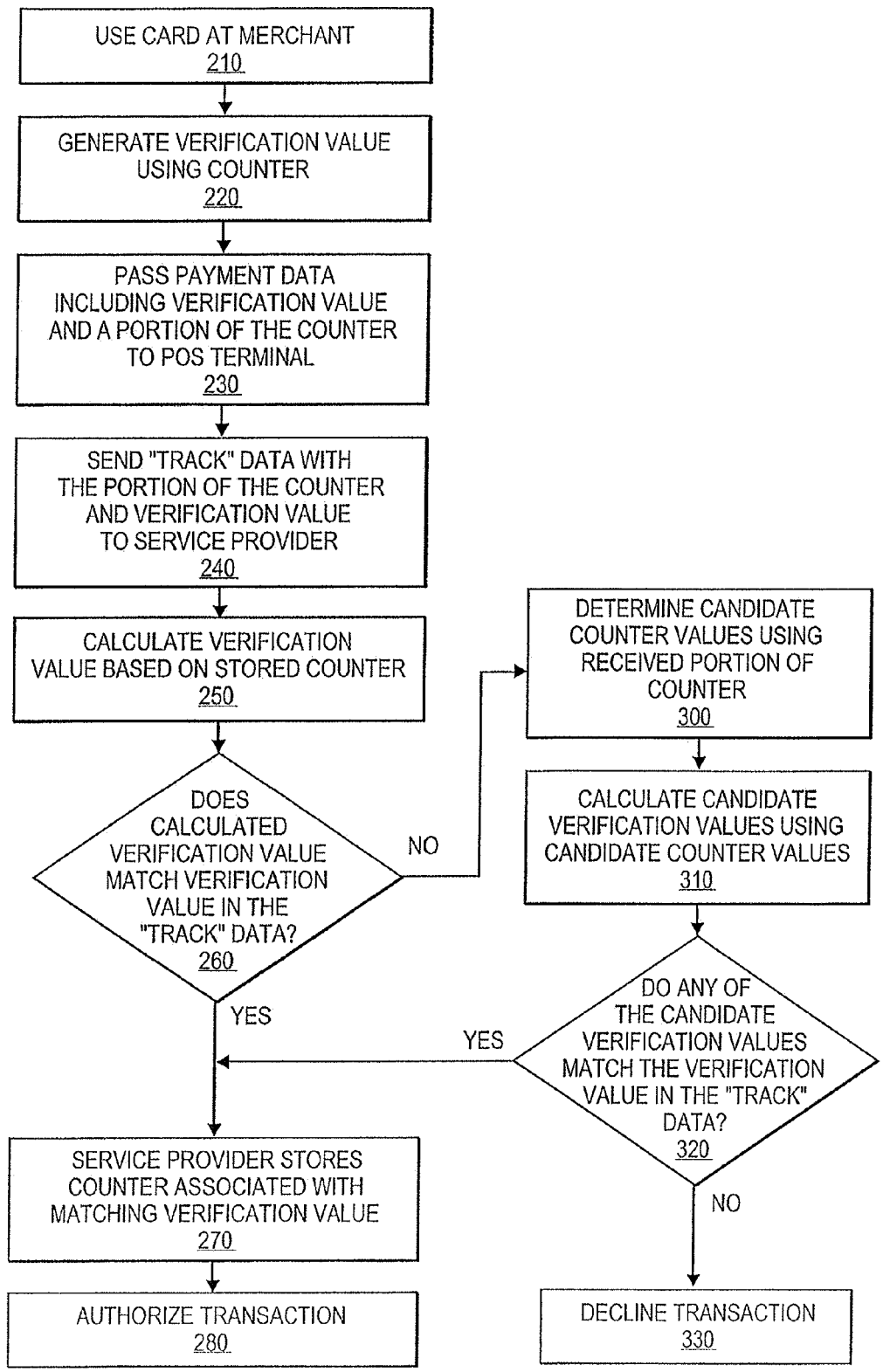
FIG. 3 is a flowchart illustrating a method for authenticating a transaction using the verification value and the portion of a counter embedded in the payment data, in accordance with the disclosure.

FIG. 3 is a flowchart illustrating a method for authenticating a transaction using the verification value and the portion of a counter embedded in the payment data that is in the form of Track data, in accordance with the disclosure.

Consumer 20 uses a payment card or other portable consumer device 30 to purchase a good or service at merchant 50 (step 210). The card comprises a counter that changes every time a transaction is completed. In one case, the card comprises a magnetic stripe with an embedded chip having the counter. An example of a rewritable magnetic stripe card can be found in U.S. Pat. No. 7,044,394, which is herein incorporated by reference in its entirety for all purposes.

Portable consumer device 30 generates a verification value using the counter and/or other dynamic data elements (step 220). The verification value and a portion of the counter are embedded in payment data that is in the form of Track data.

The Track data with the embedded verification value and portion of the counter is communicated to the POS terminal or other access device 40 at merchant 50 (step 230). In some cases, the Track data may be sent in an authorization request message from portable consumer device 30 to the POS terminal. Below is some information that may be included in Track data.

| Field Number | Length | Field Name |
|---|---|---|
| 1 | 1 | Start Sentinel |
| 2 | 16 | Primary Account Number (PAN) |
| 3 | 1 | Separator |
| 4 | 4 | Card Expiration Date |
| 5 | 3 | Service Code |
| 6 | 5 | a verification value indicator a verification value algorithm identifier |
| 7 | 8 | a CVV (positions 30 to 32). verification value data (e.g., a portion of a dynamic data element) |
| 8 | 1 | End Sentinel |
| 9 | 1 | Longitudinal Redundancy Check (LRC) |

In an alternate embodiment, the POS terminal may generate the verification value. Consumer 20 uses the card at the POS terminal to communicate information related to the transaction to the POS terminal. The POS terminal may then use the transaction information to generate a verification value. The POS terminal embeds the verification value and the portion of the counter in the payment data that is in the form of Track data.

The POS terminal or other access device 40 sends the Track data with the embedded verification value and the portion of the counter to service provider 70 (step 240). In some cases, Track data may be sent in an authorization request message to service provider 70.

In one embodiment, server 72 of service provider 70 maintains its own counter associated with the card. This counter is stored in counter database 76. In some embodiments, when the card is first issued, server 72 of service provider 70 initializes the counter on the card and the counter stored in counter database 76 to the same value. For example, the counters may be initialized to "00000." In some embodiments, server 72 of service provider 70 may retrieve counter from counter database 76, change the counter, and store the counter in counter database 76 after each completed transaction or each time the card is read.

Server 72 of service provider 70 retrieves its counter stored in counter database 76 and uses it to calculate a verification value (step 250) using an algorithm. The algorithm may follow steps similar to those shown in FIG. 2 to calculate the verification value. The calculated verification value is compared to the verification value received in the Track data.

If the calculated value matches the verification value in the Track data (step 260), server 72 (changes and) stores the retrieved counter in counter database 76 (step 270). Service provider 70 then authorizes the transaction (step 280). In some cases, service provider 70 may send an authorization message authorizing the transaction to acquirer 60 or to the POS terminal at merchant 50.

If the calculated value does not match the verification value in the Track data (step 260), server 72 uses an algorithm to determine candidate counter values using the portion of the counter received in the Track data and other suitable data associated with the card (step 300). For example, if the card was recently issued with a initial counter of "00000," and the portion of the counter in the payment data is "9," the algorithm may determine that the candidate counter value is "00009" since there were probably less than 10 transactions made since the last time that the counter was stored in the counter database 76.

In one embodiment, server 72 may use the algorithm to determine candidate counter values using the portion of the counter received in the Track data and using the counter retrieved from counter database 76. In one example, the stored counter value is "01200" and the portion of the counter received in the Track data is "1." Server 72 may use the algorithm to determine that less than 100 transactions were made since the last time the counter was stored. Therefore, "1" represents a first or second digit of the counter. In one case, the algorithm may determine that "1" represents the first digit of the counter and the candidate counter values are: "01201," "01211," "01221," "01231," "01241," "01251," "01261," "01271," "01281," and "01291." In another case, the algorithm may determine that the "1" represents the second digit of the counter and the candidate counter values are: "01210," "01211," "01212," "01213," "01214," "01215," "01216," "01217," "01218," and "01219."

Server 72 uses the algorithm to calculate the candidate verification values using the candidate counter values (step 310). The algorithm may follow steps similar to those in FIG. 2 to calculate each of the verification values. Server 72 uses the algorithm to compare the candidate verification values to the verification value in the Track data.

If any of the candidate verification values match the verification value in the Track data (step 320), the counter value associated with the matching candidate verification value represents the counter at portable consumer device 30. Server 72 of service provider 70 (changes and) stores this counter associated with the matching candidate verification value in the counter database 76 (step 270). Service provider 70 also authorizes the transaction (step 280). In some cases, service provider 70 may send a message authorizing the transaction to acquirer 60 or to the POS terminal at merchant 50.

If none of the candidate verification values match the verification value in the Track data (step 320), the transaction may be fraudulent. Service provider 70 declines the transaction (step 330). In some cases, service provider 70 may send a message declining the transaction to acquirer 60 or to POS terminal at merchant 50.

Although the above example describes server 72 as providing verification value processing, any other suitable entity may provide such verification value processing.

Modifications, additions, or omissions may be made to the method without departing from the scope of the disclosure. The method may include more, fewer, or other steps. Additionally, steps may be performed in any suitable order without departing from the scope of the disclosure.

It should be understood that the present disclosure as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a," "an," or "the" is intended to mean "one or more" unless specifically indicated to the contrary.

Many of the above examples show a "service provider" such as a payment processing organization between an issuer and an acquirer. In embodiments of the disclosure, a "service provider" may also be an issuer, third party processor, or any other entity that provides a service such as a verification value service.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

The invention claimed is:

1. A method for conducting a transaction, the method comprising:

receiving a first verification value and a portion of a first dynamic data element at a server, wherein the first verification value is calculated based in part on the first dynamic data element, and the portion of the first dynamic data element is received by the server, wherein the first dynamic data element is a counter value;

determining a plurality of candidate dynamic data elements using the portion of the first dynamic data element using a processor in the server;

calculating a plurality of candidate verification values using the plurality of candidate dynamic data elements using the processor in the server;

determining if the first verification value matches any of the plurality of candidate verification values using the processor in the server, wherein the transaction is thereafter authenticated if the first verification value matches any of the plurality of candidate verification values and wherein the first dynamic data element comprises data that can change over time;

wherein the first verification value is generated using at least one static data element, and wherein the transaction is a payment transaction;

wherein the static data element includes at least two of an expiration date, a phone number, a card number, a service code, and an account number;

wherein determining a plurality of candidate dynamic data elements using the portion of the first dynamic data element comprises calculating a plurality of potential dynamic data elements that occur in a sequence with the first dynamic data element based on a dynamic data element algorithm; and wherein each of the plurality of candidate verification values is unique to a corresponding candidate dynamic data element.

2. The method of claim 1, further comprising storing one of the plurality of candidate dynamic data elements that is associated with the matched candidate verification value in the server.

3. The method of claim 1, further comprising, after determining if the first verification value matches any of the plurality of candidate verification values, sending an authentication response message from the server to an access device, wherein the authentication response message indicates that the transaction is authorized.

4. The method of claim 1, wherein the transaction is declined if none of the plurality of candidate verification values matches the first verification value.

5. The method of claim 1, wherein the verification value is derived using unique derived keys.

6. The method of claim 1, wherein the first dynamic data element is derived from an initial dynamic data element that is derived from personal information comprising a PAN, an expiration date, and a service code.

7. A computer readable medium, comprising:

code executable on a processor in a server for receiving a first verification value and a portion of a first dynamic data element, wherein the first verification value is calculated based in part on the first dynamic data element, and the portion of the first dynamic data element is received by the server;

code executable on the processor in the server for determining a plurality of candidate dynamic data elements using the portion of the first dynamic data element;

code executable on the processor in the server for calculating a plurality of candidate verification values using the plurality of candidate dynamic data elements;

code executable on the processor in the server for determining if the first verification value matches any of the plurality of candidate verification values, wherein the transaction is thereafter authenticated if the received verification value matches any of the plurality of candidate verification values and wherein the first dynamic data element comprises data that can change over time;

wherein the first verification value is generated using at least one static data element, and wherein the transaction is a payment transaction;

wherein the static data element includes at least two of an expiration date, a phone number, a card number, a service code, and an account number;

wherein the code executable on the processor in the server for determining a plurality of candidate dynamic data elements using the portion of the first dynamic data element comprises code for calculating a plurality of potential dynamic data elements that occur in a sequence with the first dynamic data element based on a dynamic data element algorithm; and wherein each of the plurality of candidate verification values is unique to a corresponding candidate dynamic data element.

8. The computer readable medium of claim 7, further comprising code executable on the processor for storing the candidate dynamic data element associated with the matched candidate verification value.

9. The computer readable medium of claim 7, further comprising code executable on the processor for authenticating the transaction if the received verification value matches any of the plurality of candidate verification values.

10. The computer readable medium of claim 7, further comprising code executable on the processor for declining to authenticate the transaction if the received verification value does not match any of the candidate verification values.

11. The computer readable medium of claim 7, wherein the verification value is derived using unique derived keys.

12. The method of claim 7, wherein the first dynamic data element is derived from an initial dynamic data element that is derived from personal information comprising a PAN, an expiration date, and a service code.

13. The method of claim 1 wherein the first verification value is derived using a PAN, and an account sequence number, an inverse of the PAN and an inverse of the account sequence number.

14. The method of claim 1 wherein the first verification value is derived by a POS terminal.

* * * * *